US011305181B2

(12) United States Patent
    Kawasaki (10) Patent No.: US 11,305,181 B2
(45) Date of Patent: Apr. 19, 2022

(54) GAME CONTROLLER

(71) Applicant: Hirokazu Kawasaki, Tokyo (JP)

(72) Inventor: Hirokazu Kawasaki, Tokyo (JP)

( * ) Notice: Subject to any disclaimer, the term of this patent is extended or adjusted under 35 U.S.C. 154(b) by 0 days.

(21) Appl. No.: 16/874,967

(22) Filed: May 15, 2020

(65) Prior Publication Data

US 2020/0368610 A1 Nov. 26, 2020

(30) Foreign Application Priority Data

May 24, 2019 (JP) .............................. JP2019-097625

(51) Int. Cl.
    *A63F 13/24* (2014.01)
    *A63F 13/92* (2014.01)
    *A63F 13/98* (2014.01)
    *A63F 13/23* (2014.01)

(52) U.S. Cl.
    CPC .............. *A63F 13/24* (2014.09); *A63F 13/23* (2014.09); *A63F 13/92* (2014.09); *A63F 13/98* (2014.09)

(58) Field of Classification Search
    None
    See application file for complete search history.

(56) References Cited

U.S. PATENT DOCUMENTS

| | | | | |
|---|---|---|---|---|
| 5,726,349 A | * | 3/1998 | Palmertree | E02D 1/022 73/84 |
| 5,782,818 A | * | 7/1998 | Shubin | A61B 10/0058 600/38 |
| 6,793,619 B1 | * | 9/2004 | Blumental | A61H 19/32 600/38 |
| 2004/0082831 A1 | * | 4/2004 | Kobashikawa | A61H 19/44 600/38 |
| 2005/0014560 A1 | * | 1/2005 | Blumenthal | G06F 3/016 463/36 |
| 2005/0261870 A1 | * | 11/2005 | Cramer | B25H 1/0092 702/166 |
| 2009/0099413 A1 | * | 4/2009 | Kobashikawa | A61H 19/40 600/38 |
| 2014/0116127 A1 | * | 5/2014 | Christian | G01N 33/18 73/170.17 |
| 2015/0036150 A1 | * | 2/2015 | Kobayashi | G02B 23/2423 356/614 |

(Continued)

FOREIGN PATENT DOCUMENTS

JP         2013-116231 A         6/2013

OTHER PUBLICATIONS

Akihabara News, Tuttuki Bako Hands-On . . . Well Almost. Dec. 19, 2008, https://www.youtube.com/watch?v=YpCCWbmbmeY , p. 1 (Year: 2008).*

*Primary Examiner* — Tramar Harper
(74) *Attorney, Agent, or Firm* — Locke Lord LLP (57) ABSTRACT

To provide a game controller with which a detection means for detecting an insertion degree of a length can be simplified. A game controller includes a controller body to which is attached a flexible member having formed therein an insertion hole into which a length is inserted, a laser transmitter/receiver that is installed on an outer periphery of the controller body and measures a distance with respect to a base surface of the length by transmission and reception of a wave to detect an insertion degree of the length inserted from the insertion hole, and a wiring cable and a control circuit that output the insertion degree of the length detected by the laser transmitter/receiver.

2 Claims, 6 Drawing Sheets

(56) References Cited

U.S. PATENT DOCUMENTS

| | | | |
|---|---|---|---|
| 2015/0221185 A1* | 8/2015 | Dunaevsky | G07F 17/3293 |
| | | | 463/13 |
| 2015/0233806 A1* | 8/2015 | More | G01N 3/40 |
| | | | 73/85 |
| 2016/0136034 A1* | 5/2016 | Cai | A61B 10/0058 |
| | | | 600/38 |
| 2017/0160911 A1* | 6/2017 | Ho | G06F 3/0393 |
| 2020/0088711 A1* | 3/2020 | More | G01N 21/95 |

* cited by examiner

GAME CONTROLLER

TECHNICAL FIELD

The present invention relates to a game controller for operating a game executed on a personal computer or a game machine, etc.

BACKGROUND ART

Conventionally, there are known controllers for operating game programs. Generally, a game controller is held by a hand or hands and a game is operated by operating keys included in the game controller with fingers or by moving the game controller itself in space.

Also, new types of game controllers have been developed as well.

In PTL 1 is described a game controller having a controller body that has a hollow housing with an opening portion formed at one end surface and is provided, in an interior of the housing, with an internal input means capable of inputting a predetermined instruction signal into a game program and a flexible member loaded in an interior of the controller body and formed with an insertion hole oriented along an axis and where, when a length is inserted in the insertion hole, the flexible member expands outward in a radial direction, and contacts or pushes the internal input means to input the instruction signal. The game controller described in PTL 1 enables an input operation to be performed in response to an insertion operation or an extraction operation similar to an insertion operation or an extraction operation of an operated object in a game.

CITATION LIST

Patent Literature

[PTL 1] JP 2013-116231 A

SUMMARY OF INVENTION

Technical Problem

However, with the game controller described in PTL 1, a plurality of the internal input means must be disposed to detect an insertion degree of the length (paragraph [0058]).

Thus, an object of the present invention is to provide a game controller with which a means for detecting an insertion degree of a length can be simplified.

Solution to Problem

In order to solve the above problem, a game controller according to the present invention is characterized in comprising a controller body to which is attached a flexible member having formed therein an insertion hole into which a length is inserted; a detection means configured to be installed on an outer periphery of the controller body and measure a distance with respect to abase surface of the length by transmission and reception of a wave to detect an insertion degree of the length inserted from the insertion hole: and an output means configured to output the insertion degree of the length detected by the detection means.

By the present arrangement, the insertion degree of the length can be detected without disposing a plurality of the detection means.

By the wave being laser light, measurement can be made noncontactingly, in real time, and with high precision.

By the controller body having an attaching member that enables a plurality of the flexible members differing in outer dimensions to be attached detachably, the flexible members differing in size can be fixed securely without limitation to an arrangement of dedicated size.

Advantageous Effects of Invention

By the present invention, a game controller can be provided with which a detection means for detecting an insertion degree of a length can be simplified.

DESCRIPTION OF EMBODIMENTS

An embodiment of the present invention shall now be described in detail with reference to the drawings.

Embodiment

Figure 1:
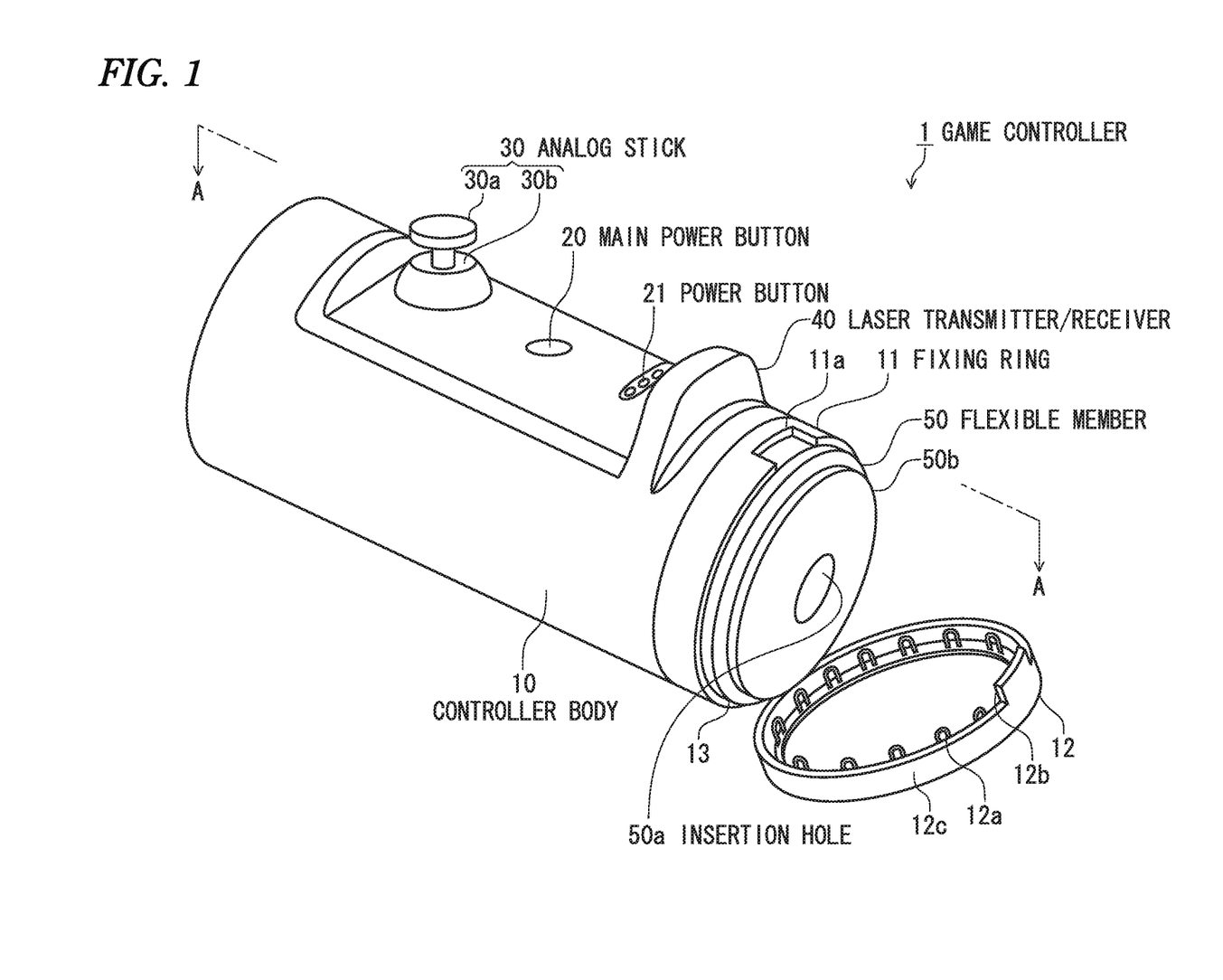
FIG. 1 is a perspective view of a game controller according to an embodiment of the present invention.
Figure 2A:
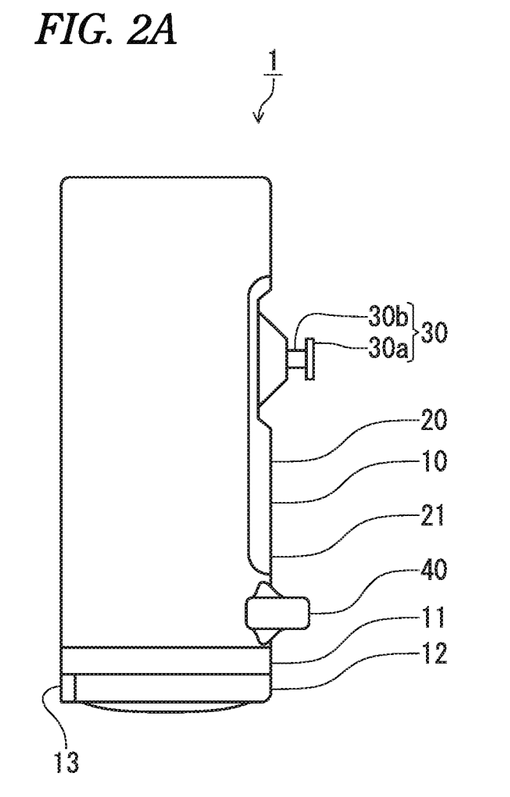
FIG. 2A, FIG. 2B and FIG. 2C show diagrams showing the game controller according the embodiment of the present invention with FIG. 2A being a side view thereof, FIG. 2B being an upper view thereof, and FIG. 2C being a front view thereof.
Figure 2B:
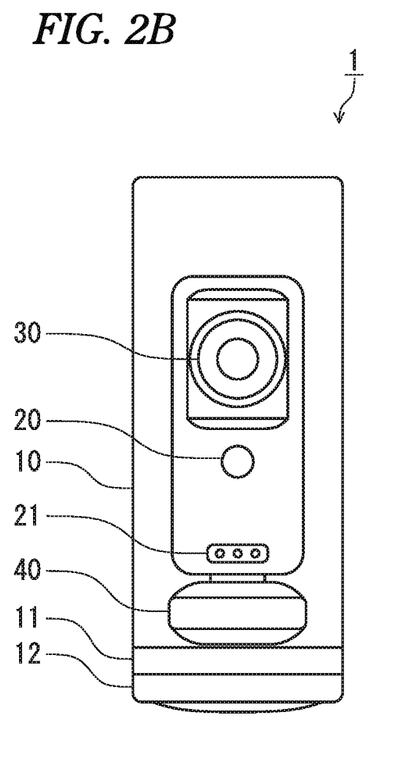
Figure 2C:
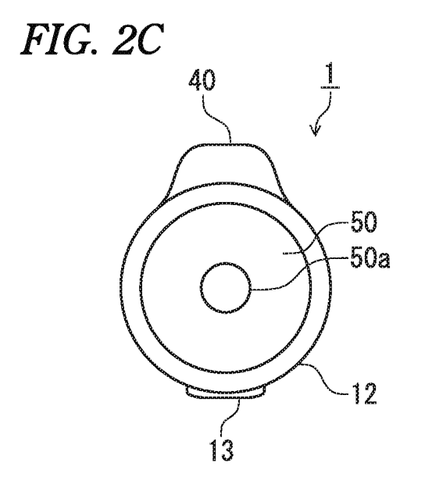

FIG. 1 is a perspective view of a game controller according to the embodiment of the present invention, FIG. 2A is a side view thereof, FIG. 2B is an upper view thereof, and FIG. 2C is a front view thereof.

In the following description, "wave" is a general term for sound waves, radio waves, and light. With the present embodiment, an example where, among "waves," "light" (laser light) is used shall be described, and with a modification example, an example where a "sound wave" (ultrasonic wave) is used shall be described.

The game controller 1 according to the present embodiment is for operating a game executed on a personal computer or a game machine.

As shown in FIG. 1, FIG. 2A, FIG. 2B and FIG. 2C, the game controller 1 includes a controller body 10 to which is attached a flexible member 50 having formed therein an insertion hole 50a into which a length is inserted, a laser transmitter/receiver 40 (detection means) that is installed on an outer periphery of the controller body 10 and measures a distance with respect to a base surface of the length by transmission and reception of a wave to detect an insertion degree of the length inserted from the insertion hole 50a, a control circuit 45 (output means) (see FIG. 5 and FIG. 6) that outputs the insertion degree of the length detected by the laser transmitter/receiver 40, and rubber bands 15 (attaching member) (see FIG. 3A, FIG. 3B, FIG. 4A and FIG. 4B) that enable a plurality of the flexible members 50 differing in outer dimensions to be attached detachably.

The controller body 10 is normally formed of a plastic, such as polyethylene (PE), polypropylene (PP), polyvinyl acetate (PVA), acrylonitrile-butadiene-styrene copolymer (ABS), etc.

With the game controller 1, a game can also be operated in a state where the controller body 10 of cylindrical shape is gripped with one or both hands. A main power button 20 that turns power on and off, a power button 21 of the laser transmitter/receiver 40, and an analog stick 30 constituted of an operating plate 30a and a rod 30b are installed on an outer surface of the controller body 10. On and off are repeated when the main power button 20 is pressed. The power button 21 is turned on and off by sliding. Also, an LED (Light Emitting Diode), etc., that lights up in accordance with a progress state of the game can be provided as well.

Figure 3A:
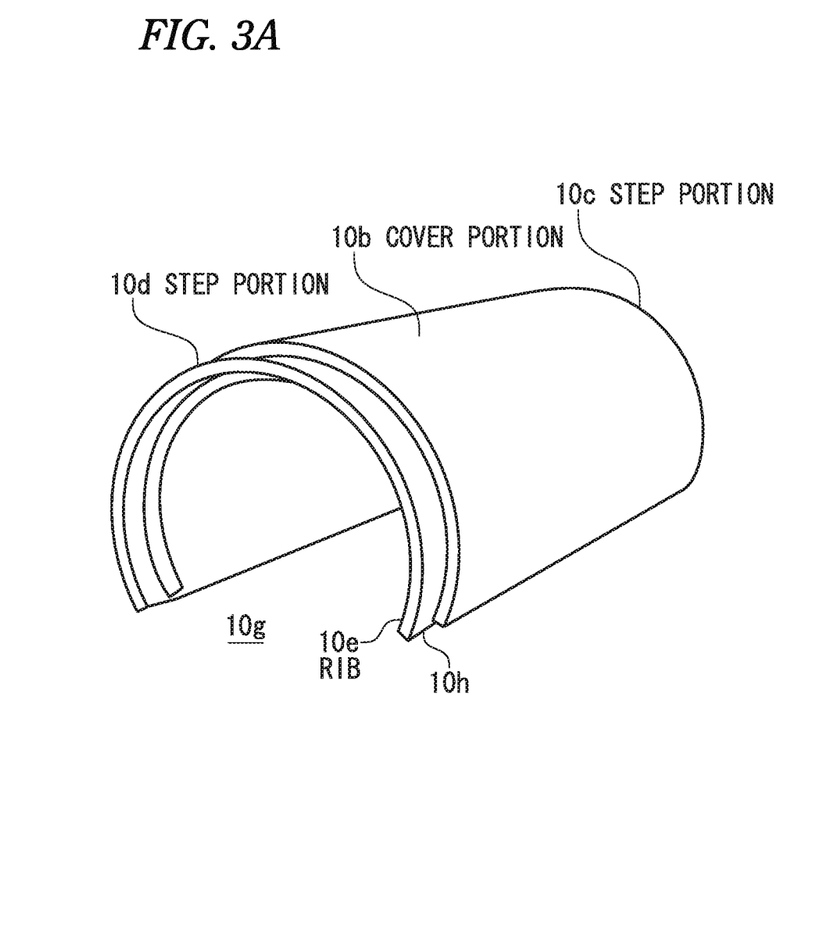
FIG. 3A and FIG. 3B are exploded perspective views of the game controller according the embodiment of the present invention.
Figure 3B:
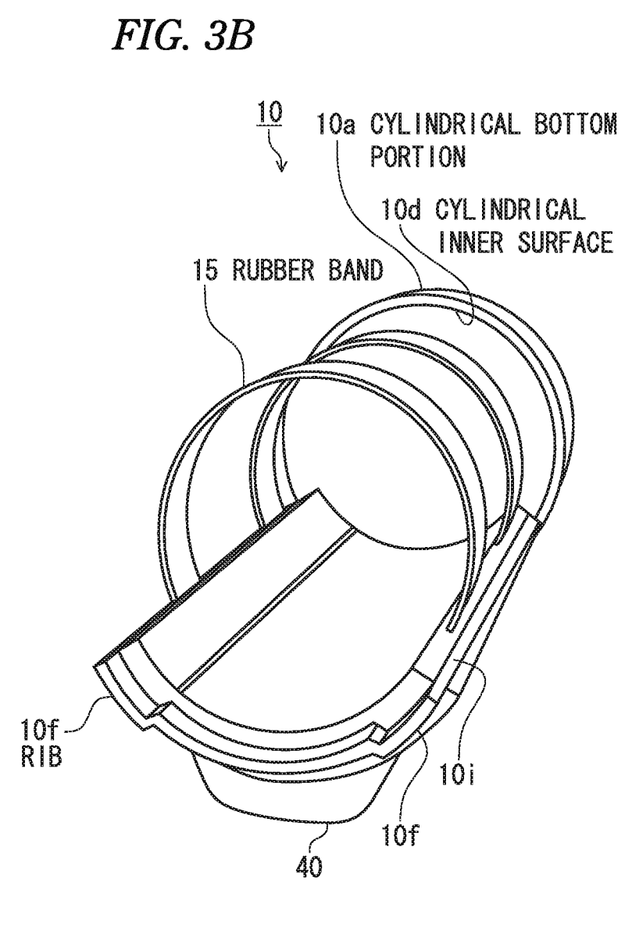
Figure 4A:
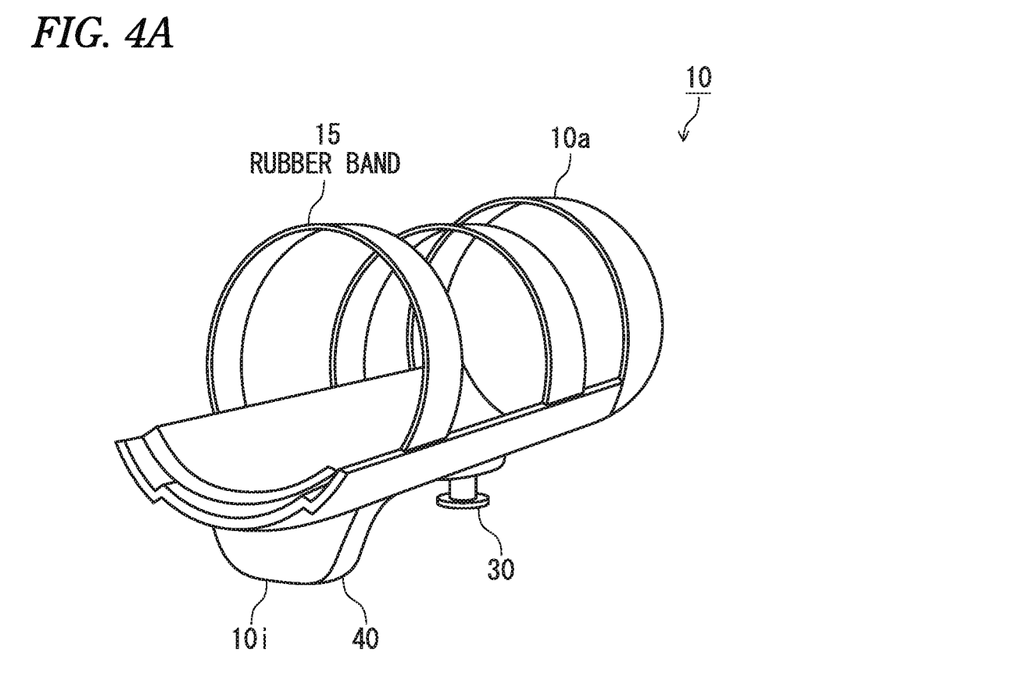
FIG. 4A and FIG. 4B show diagrams showing the game controller according the embodiment of the present invention with FIG. 4A being a perspective view of a state where a flexible member is removed from a cylindrical bottom portion of a controller body and FIG. 4B being a perspective view of a state where the flexible member is fixed to the cylindrical bottom portion of the controller body.
Figure 4B:
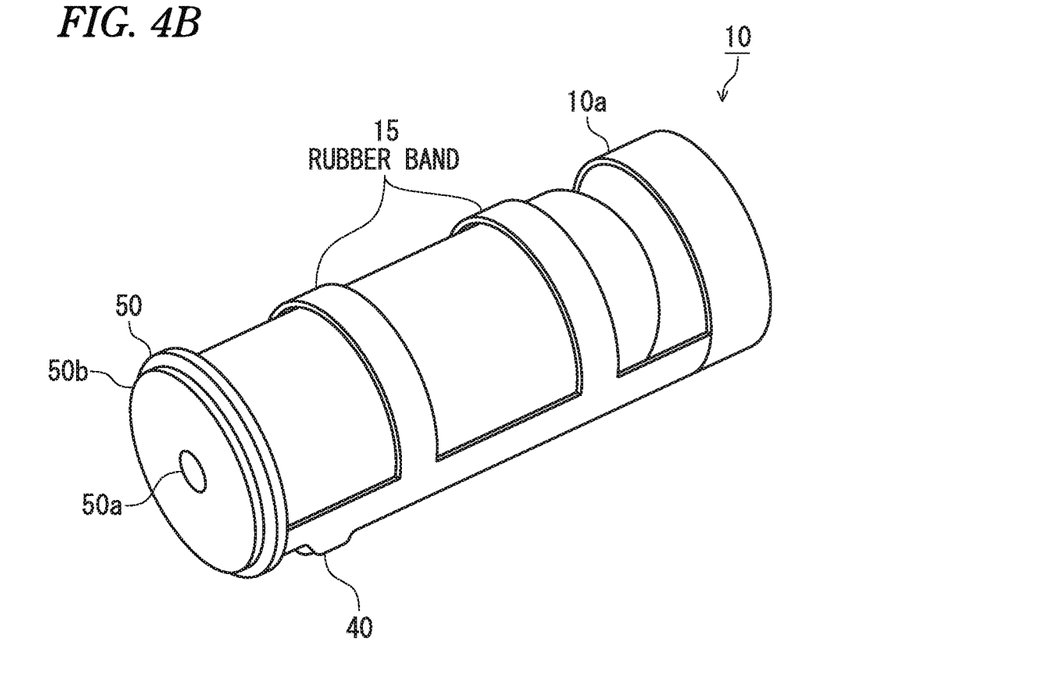

FIG. 3A and FIG. 3B are exploded perspective views of the game controller according the embodiment of the present invention, FIG. 4A is a perspective view of a state where the flexible member 50 is removed from a cylindrical bottom portion 10a of the controller body 10, and FIG. 4B is a perspective view of a state where the flexible member 50 is fixed to the cylindrical bottom portion 10a of the controller body 10.

As shown in FIG. 3A, FIG. 3B, FIG. 4A and FIG. 4B, the controller body 10 is of a cylindrical shape with bottom and includes a cylindrical bottom portion 10a, a cover portion 10b of semi-cylindrical shape that is mounted to an outer peripheral portion of a front side (insertion hole 50a side) of the cylindrical bottom portion 10a, a fixing ring 11 (see FIG. 1) of circular annular shape that combines and fixes the front side of the cylindrical bottom portion 10a and a front side of the cover portion 10b, and a flexible member fixing ring 12 that is pivotably mounted via a hinge 13 to an outer peripheral portion of the fixing ring 11 and fixes the flexible member 50 by pressing it from peripheral directions.

As shown in FIG. 1, the fixing ring 11 has, on an outer peripheral portion at an upper surface side (laser transmitter/receiver 40 side), a recess 11a that locks a hook 12b (to be described below) of the flexible member fixing ring 12. The flexible member fixing ring 12 has a main body ring portion 12a abutting an inner peripheral surface against and thereby holding a small diameter portion 50b (to be described below) of the flexible member 50, the hook 12b that, when the flexible member is fixed, combines with the recess 11a of the fixing ring 11 to lock the main body ring portion 12a, and a plurality of projections 12c that are provided on the inner peripheral surface of the main body ring portion 12a and press an outer peripheral portion of the flexible member 50 from the peripheral directions. By the plurality of projections 12c pressing the outer peripheral portion of the flexible member 50, the flexible member 50 is prevented from moving inadvertently in outer radial directions and front/rear directions.

The main body ring portion 12a of the flexible member fixing ring 12 is mounted via the hinge 13 to an outer peripheral portion of a lower surface side of the fixing ring 11. When the hook 12b of the flexible member fixing ring 12 is removed from the recess 11a of the fixing ring 11, the main body ring portion 12a is opened outward and the small diameter portion 50b of the flexible member 50 is exposed as shown in FIG. 1. By turning the fixing ring 11 to a predetermined position in this state, the fixing ring 11 can be removed from the cylindrical bottom portion 10a and the cover portion 10b, and attachment/detachment of the flexible member 50 becomes enabled.

As shown in FIG. 3A and FIG. 3B, the cover portion 10b has a step portion 10c at an end portion at a rear side (opposite side to the insertion hole 50a) and the step portion 10c is combined with a circumferential inner surface 10d at a bottomed side of the cylindrical bottom portion 10a to engage the rear side of the cover portion 10b. Also, the cover portion 10b has a rib 10e of semicircular shape at an end portion at a front side (insertion hole 50a side) and the rib 10e is combined with a rib 10f of semicircular shape at an end portion at a front side (insertion hole 50a side) of the cylindrical bottom portion 10a. A circular opening portion 10g having a step portion constituted of the rib 10e and the rib 10f is thereby formed at a front side (insertion hole 50a side) of the controller body 10, and the fixing ring 11 (see FIG. 1) of circular annular shape can be fixed to outer peripheral portions of the rib 10e and the rib 10f.

At end surfaces at which the cylindrical bottom portion 10a and the cover portion 10b are combined, an engaging projection 10h and an engaging groove 10i engaging with the engaging projection 10h are provided at the cover portion 10b and the cylindrical bottom portion 10a, respectively, to enable both components to be engaged tightly.

In a state where the fixing ring 11 is combined with an outer peripheral surface of the circular opening portion 10g of the cylindrical bottom portion 10a and the cover portion 10b, the cover portion 10b will not become detached and the flexible member 50 will not fall off from the controller body 10 even if vibration or impact of some degree is applied to the controller body 10.

As shown in FIG. 3A, FIG. 3B, FIG. 4A and FIG. 4B, at an inner peripheral surface of the cylindrical bottom portion 10a, a plurality of columns of the rubber bands 15 are provided at positions orthogonal to a direction of entry of the length. The rubber bands 15 are constituted of expandable/contractible elastic members and can securely fix front and rear portions of the flexible member 50 as shown in FIG. 4B. With the present invention, a sensor is not provided inside the controller body 10 and therefore a wide space can be provided inside the controller body 10. Also, there is no dependence on sensor position and therefore a degree of freedom of design in the internal space is high. Due to these features, designing can be performed with material quality, shape, installation position, and installed quantity being optimal in regard to the attaching member that detachably attaches the flexible member 50. The attaching member (the rubber bands 15 in the present case) can thereby be installed and, in particular, flexible members of different sizes can be fixed securely.

The flexible member 50 has the insertion hole 50a enabling insertion of the length, and a small diameter portion 50b provided at an end portion at the insertion hole 50a side and being for restriction, by the flexible member fixing ring 12, of movement of the flexible member 50 in an axial direction.

As shown in FIG. 1 and FIG. 4B, a large portion of the flexible member 50 is installed in an interior of the controller body 10 and a portion of the insertion hole 50a of the flexible member 50 is in a state of being exposed to an exterior of the controller body 10. Also, as shown in FIG. 4A, the flexible member 50 is attachable/detachable to and from the controller body 10 and the rubber bands 15 when the cover portion 10b of the controller body 10 is opened.

The flexible member 50 suffices to have a flexibility of a degree such that a diameter of the insertion hole 50a is pressingly expanded when a slender object that is thicker than the diameter of the insertion hole 50a is inserted into the insertion hole 50a and is formed of a material of high flexibility, such as an elastomer, etc. The insertion hole 50a enabling insertion of a finger or other length is formed in a portion of the flexible member 50 exposed to the exterior of the controller body 10.

Figure 5:
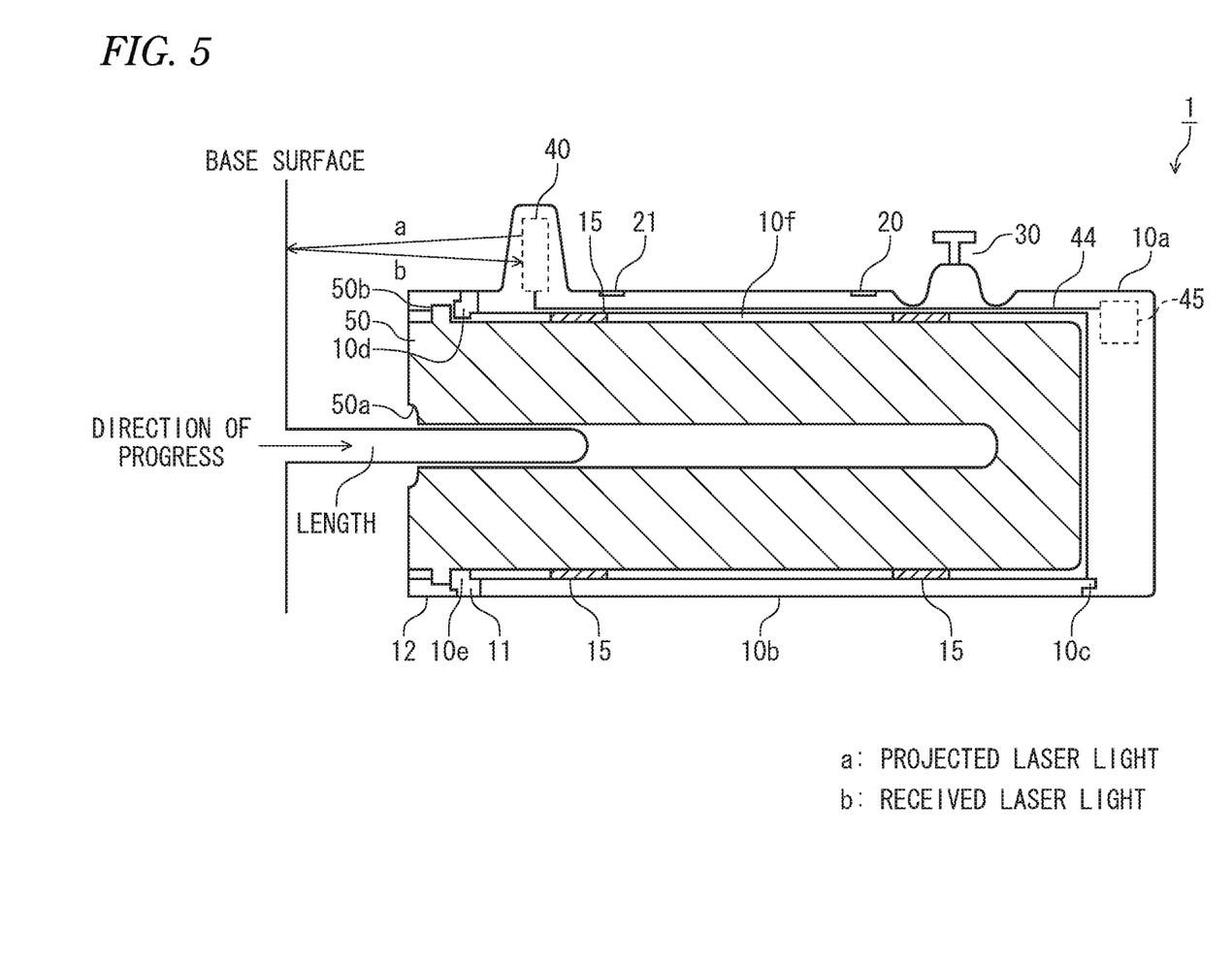
FIG. 5 is a sectional view taken along A-A of FIG. 1.

FIG. 5 is a sectional view taken along A-A of FIG. 1. In FIG. 5, structures besides portions related to the laser transmitter/receiver 40 installed on the outer periphery of the controller body 10 are simplified.

As shown in FIG. 5, the laser transmitter/receiver 40 that measures the distance with respect to the base surface of the length by transmission and reception of the wave to detect the insertion degree of the length inserted from the insertion hole 50a is disposed on the outer periphery of the controller body 10. The laser transmitter/receiver 40 is connected via a wiring cable 44 (output means) to the control circuit 45 (output means) installed in the cylindrical bottom portion 10a of the controller body 10. The control circuit 45 supplies power to the laser transmitter/receiver 40 and receives a sensor signal from the laser transmitter/receiver 40. The control circuit 45 outputs the insertion degree of the length detected by the laser transmitter/receiver 40. Here, the laser transmitter/receiver 40 and the control circuit 45 are driven by an unillustrated battery.

The laser transmitter/receiver 40 includes, for example, a laser transmitting portion constituted of a laser diode and a light projecting lens and a laser receiving portion constituted of a light receiving lens and a CMOS (Complementary Metal Oxide Semiconductor) or other light receiving element, irradiates the laser light (see projected laser light a in FIG. 5) onto the base surface, and, by reflected light thereof (see received laser light b in FIG. 5), detects an entry distance of the length projecting from the base surface. The laser transmitter/receiver 40 may be of any ranging method as long as laser light is used. Representative distance measuring methods using laser include a "triangulation ranging method" and a "phase difference ranging method." The "triangulation ranging method" is a method where reflected light of a laser irradiated onto an object is read by a light receiving element inside a sensor and distance measurement is performed using principles of triangulation. The "triangulation ranging method" has an advantage that the sensor is comparatively inexpensive, compact, and high in precision. Also, if the "phase difference ranging method" is used, detection of along distance is enabled.

Also, the base surface is a surface from which the length projects and may be of any arrangement as long as it is a surface that can reflect the laser light. For example, if the length is a finger, the base surface is a surface of the wrist or the body.

The game controller 1 has an arrangement where the laser transmitter/receiver 40 is installed at an exterior of the controller body 10 (on the outer periphery of the controller body 10 in the present case) and therefore, even though the insertion degree of the length into the flexible member 50 in the interior of the controller body 10 is detected, the insertion degree of the length into the flexible member 50 can be detected without dependence on an internal state (internal structure) of the controller body 10.

As shown in FIG. 5, when a user inserts a finger or other length into the insertion hole 50a of the flexible member 50, a distance from the laser transmitter/receiver 40 installed on the outer periphery of the controller body 10 to the base surface (surface of the wrist or the body) changes. The laser transmitter/receiver 40 measures the distance from the laser transmitter/receiver 40 to the base surface by transmission and reception of the laser light to detect the insertion degree of the length inserted from the insertion hole 50a. The laser transmitter/receiver 40 outputs the sensor signal to the control circuit 45 via the wiring cable 44. The insertion degree of the length can thereby be detected in real time. By using the laser light as the wave, the laser transmitter/receiver 40 can make measurements noncontactingly and with high precision.

As described above, the game controller 1 of the present embodiment includes the controller body 10 to which is attached the flexible member 50 having formed therein the insertion hole 50a into which the length is inserted, the laser transmitter/receiver 40 that is installed on the outer periphery of the controller body 10 and measures the distance with respect to the base surface of the length by transmission and reception of the wave to detect the insertion degree of the length inserted from the insertion hole 50a, and the wiring cable 44 and the control circuit 45 that output the insertion degree of the length detected by the laser transmitter/receiver 40.

With the device described in PTL 1, a plurality of the internal input means had to be disposed to detect the insertion degree of the length (paragraph [0058] of PTL 1). On the other hand, with the present embodiment, the insertion degree of the length can be detected using one laser transmitter/receiver 40 even in a case of accommodating a game requiring a complex operation. That is, the insertion degree of the length can be detected without disposing a plurality of the detection means.

With the device described in PTL 1, a sensor is provided inside the controller body and therefore, there are restrictions in sensor position, size and shape of the flexible member, etc. On the other hand, the game controller 1 of the present embodiment is of the arrangement where the laser transmitter/receiver 40 is installed on the outer periphery of the controller body 10 and therefore, the insertion degree of the length into the flexible member 50 can be detected without dependence on the internal state of the controller body 10. Flexible members 50 differing in size and shape can be disposed freely.

With the present embodiment, the controller body 10 has the attaching member (rubber bands 15) that enables a plurality of the flexible members 50 differing in outer dimensions to be attached detachably. Conventionally, the internal input means functions by contact or pressing and therefore the flexible member is restricted to that of dedicated size even if it is detachable. With the present embodiment, a sensor is not provided inside the controller body 10 and therefore, the degree of freedom of design in the space inside the controller body 10 is high. Therefore, the material quality, shape, installation position, and installed quantity can be designed optimally in regard to the attaching member that detachably attaches the flexible member 50 and flexible members of different sizes can be fixed securely.

Modification Example

With the modification example, an example where, among "waves," a "sound wave" (ultrasonic wave) is used shall be described.

Figure 6:
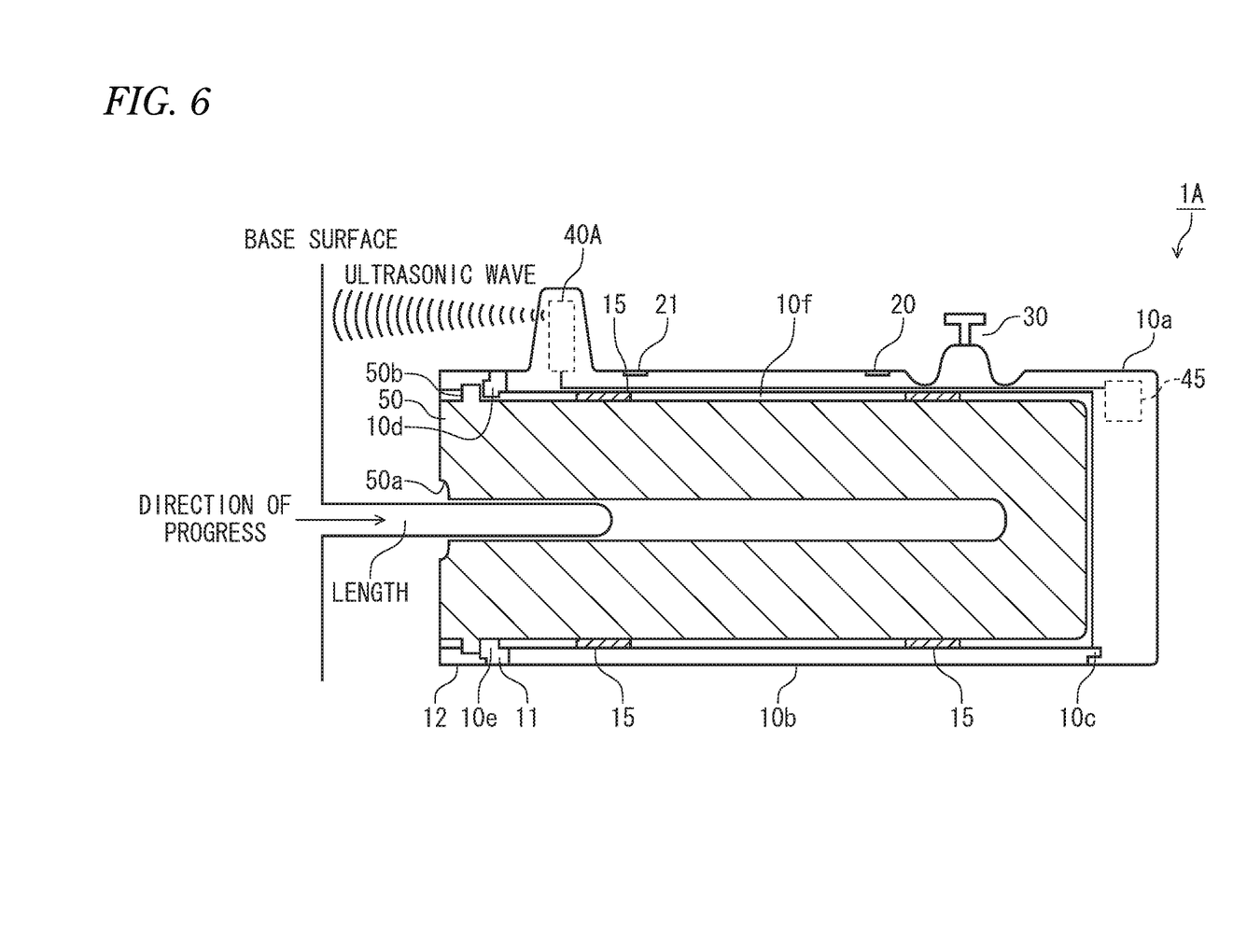
FIG. 6 is a sectional view of a game controller of a modification example.

FIG. 6 is a sectional view of a game controller 1A of the modification example. Components that are the same as those of FIG. 5 are provided with the same symbols and description of redundant parts shall be omitted.

As shown in FIG. 6, the game controller 1A includes an ultrasonic sensor 40A (detection means) in place of the laser transmitter/receiver 40 of FIG. 1 to FIG. 5.

The ultrasonic sensor 40A emits an ultrasonic wave, receives the ultrasonic wave reflected upon hitting the base surface, and determines a distance to the base surface from a product of a speed (speed of sound) at which the ultrasonic wave is transmitted through air and half of a time of transmission and reception (propagation time).

Also, the ultrasonic sensor 40A may use the Doppler effect to perform speed measurement with the ultrasonic wave and detect movement of insertion of the length.

According to the present modification example, the same effects as the embodiment can be exhibited, that is, the insertion degree of the length can be detected using one ultrasonic sensor 40A and also, the flexible members 50 differing in size and shape can be disposed freely inside the controller body 10.

Also, in general, an ultrasonic sensor can be incorporated at a lower cost than a laser transmitter/receiver.

The above description is illustrative of preferred embodiments of the present invention and the scope of the present invention is not restricted thereto.

For example, the game controllers 1 and 1A of the present embodiment may have a USB (Universal Serial Bus) connector in assumption of being externally connected to a personal connector. Also, arrangement as a remote controller equipped with a wireless communication function by Bluetooth (registered trademark), etc., is allowable or being integrally connected by a connection cable to a game machine, etc., is allowable as well.

The disclosure of Japanese Patent Application No. 2019-097625 filed on May 24, 2019 including the description, claims and drawings is incorporated herein by reference in its entirety.

All publications, patents, and patent applications cited in this description are incorporated herein by reference in their entirety.

REFERENCE SIGNS LIST 1, 1A Game controller
10 Controller body
10a Cylindrical bottom portion
10b Cover portion
11 Fixing ring
15 Rubber band (attaching member)
20 Main power button
21 Power button
30 Analog stick
40 Laser transmitter/receiver (detection means)
40A Ultrasonic sensor (detection means)
44 Wiring cable (output means)
45 Control circuit (output means)
50 Flexible member
50a Insertion hole

The invention claimed is:

1. A game controller comprising:
a controller body to which is attached a flexible member having formed therein an insertion hole into which a length is inserted;
a detection means configured to be installed on an outer periphery of the controller body and measure a distance with respect to a base surface of the length by transmission and reception of a wave to detect an insertion degree of the length inserted from the insertion hole, the detection means being further configured to be installed on an outer periphery of the controller body away from the insertion hole through which the length is inserted; and
an output means configured to output the insertion degree of the length detected by the detection means,
wherein the controller body has an attaching member that enables a plurality of flexible members differing in outer dimensions to be attached detachably.

2. The game controller according to claim 1, wherein the wave is laser light.

* * * * *